(12) United States Patent
Willemse et al.

(10) Patent No.: US 11,748,493 B2
(45) Date of Patent: *Sep. 5, 2023

(54) SECURE ASSET MANAGEMENT SYSTEM

(71) Applicant: Rambus Inc., San Jose, CA (US)

(72) Inventors: Gijs Willemse, Veldhoven (NL); Marc Van Hoorn, Drunen (NL); Marcel Van Loon, Oss (NL)

(73) Assignee: Rambus Inc., San Jose, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/222,830

(22) Filed: Apr. 5, 2021

(65) Prior Publication Data

US 2021/0319117 A1     Oct. 14, 2021

Related U.S. Application Data

(63) Continuation of application No. 15/594,122, filed on May 12, 2017, now Pat. No. 10,970,401.

(30) Foreign Application Priority Data

May 17, 2016 (EP) .................................. 16170012

(51) Int. Cl.
*G06F 21/60* (2013.01)
*G06F 21/62* (2013.01)
(Continued)

(52) U.S. Cl.
CPC ........ *G06F 21/602* (2013.01); *G06F 12/1408* (2013.01); *G06F 21/53* (2013.01);
(Continued)

(58) Field of Classification Search
CPC .. G06F 21/53; G06F 21/60–645; G06F 21/79; G06F 21/85; G06F 12/1408;
(Continued)

(56) References Cited

U.S. PATENT DOCUMENTS 7,130,977 B1    10/2006  Christie et al.
7,237,081 B2     6/2007  Dahan et al.
(Continued)

OTHER PUBLICATIONS

US 2010/0122095 A1, 05/2010, Jones et al. (withdrawn)
EP Extended European Search Report dated Dec. 1, 2016 re: EP Appln. No. 16170012.5. 5 Pages.

*Primary Examiner* — Madhuri R Herzog
(74) *Attorney, Agent, or Firm* — Lowenstein Sandler LLP

(57) ABSTRACT

A system can include a processor having a secure mode and a non-secure mode, and a secure module configured to respond to tokens posted by the processor in the secure mode. Each token can identify a secure asset, and source and destination addresses within secure and public address spaces. The secure module can include a memory storing secure assets identifiable by the tokens and a memory access circuit to read data from source addresses and write processed data to destination addresses. The system can further include a cryptography engine configured to process the read data using identified secure assets. The secure module can respond to tokens posted in the non-secure mode. The memory can store, with each secure asset, a respective rule defining the address spaces where the memory access circuit may read and write data. The secure module can ignore tokens that do not satisfy respective rules.

20 Claims, 2 Drawing Sheets

(51) Int. Cl.
*G06F 21/85* (2013.01)
*G06F 21/79* (2013.01)
*G06F 12/14* (2006.01)
*G06F 21/53* (2013.01)
*H04L 9/06* (2006.01)
*H04L 9/32* (2006.01)

(52) U.S. Cl.
CPC .......... *G06F 21/6218* (2013.01); *G06F 21/79* (2013.01); *G06F 21/85* (2013.01); *H04L 9/0631* (2013.01); *H04L 9/3213* (2013.01); *H04L 9/3234* (2013.01); *G06F 2212/1052* (2013.01)

(58) Field of Classification Search
CPC ..... G06F 2212/1052; H04L 9/32–3297; H04L 9/0631
See application file for complete search history.

(56) References Cited

U.S. PATENT DOCUMENTS

| | | |
|---|---|---|
| 2004/0177269 A1 | 9/2004 | Belnet et al. |
| 2004/0230836 A1* | 11/2004 | Larsen ................ G06F 21/6218 726/4 |
| 2006/0242066 A1* | 10/2006 | Jogand-Coulomb ... G06F 21/10 705/50 |
| 2007/0067826 A1 | 3/2007 | Conti |
| 2009/0259857 A1* | 10/2009 | Gehrmann .............. G06F 21/10 713/193 |
| 2010/0306519 A1 | 12/2010 | Buonpane et al. |
| 2013/0276149 A1 | 10/2013 | Gremaud et al. |
| 2014/0237609 A1 | 8/2014 | Sharp et al. |
| 2014/0298026 A1 | 10/2014 | Isozaki et al. |
| 2015/0363333 A1 | 12/2015 | Wallace et al. |
| 2015/0379307 A1 | 12/2015 | Teglia |
| 2016/0350561 A1 | 12/2016 | Poiesz et al. |

* cited by examiner

SECURE ASSET MANAGEMENT SYSTEM

RELATED APPLICATION

This application is a continuation application of U.S. patent application Ser. No. 15/594,122, filed May 12, 2017, which claims the benefit under 35 U.S.C § 119(a) of European Patent Application No. 16170012.5, filed May 17, 2016, the entire contents of both are hereby incorporated by reference herein.

TECHNICAL FIELD

This disclosure relates to a data processing system including a Trusted Execution Environment (TEE), and more specifically to a secure module that stores secure assets for use in the TEE.

BACKGROUND

FIG. 1 is a block diagram of an exemplary data processing system including a TEE implemented around a specific secure module 10 offering a secure asset store. The secure module 10, a host processor or CPU 12, and a memory 14 are interconnected through a system bus B.

The memory 14 is partitioned into a secure area 14a and a public area 14b. The secure area 14a contains code and data that are part of the TEE. It is only accessible by trusted elements, such as the secure module 10, and the CPU only when it operates in secure mode, which is identified by a secure-mode signal S issued by the CPU on the bus. In secure mode, the CPU thus executes trusted code stored in the secure memory area and has access to secure data stored in that same memory area. The public memory area 14b is accessible both in secure mode and non-secure mode.

The secure module 10 may be selected from the "VaultIP" product line offered by Inside Secure, for instance the VaultIP-130 that is schematically depicted here.

The secure module or vault 10 includes an internal volatile memory 16 storing several assets that should not be exposed in plaintext format to an untrusted environment. The assets typically include temporary symmetric keys or session keys. These assets or keys are usable for encryption or decryption processes accelerated internally by a cipher core 18. The cipher core 18 may actually include multiple cipher engines, such as AES, 3DES, SHA-256, etc. A sequencer 20 controls the cipher core 18 and other elements of the vault based on firmware stored in a non-volatile memory 22.

The vault includes a secure mailbox 24 connected to the bus. The mailbox is configured to receive commands called tokens from the CPU in secure mode. Typically, a token may be used to install an asset in the internal memory 16, read an asset, request encryption or decryption of data using an identified asset and an identified cipher, etc.

The data processed by the cipher core is exchanged with the system memory 14 through a direct memory access (DMA) controller 26 connected to the bus B in bus-master mode. The secure or public memory area accessed by the DMA controller may be selected, like for the CPU, by a secure-mode signal S issued on the bus.

A system such as disclosed above, where a TEE coexists with an untrusted or rich execution environment, introduces significant overhead when operations require switching back and forth between security domains. Switching a CPU to secure mode typically requires flushing the cache memory, saving the contexts of multiple parallel tasks, flushing the contexts, loading the trusted code from the secure memory area, and executing the trusted code in single-task mode with the cache memory and interruptions disabled.

SUMMARY

In a general aspect a data processing system with a trusted execution environment can include a host processor having a secure mode for operating in the trusted execution environment and a non-secure mode; a system bus connected to the host processor; resources connected to the system bus, accessible through addresses within a secure address space used by the trusted execution environment and a public address space; and a secure module connected to the system bus, configured to respond to tokens posted by the host processor in secure mode, wherein each token identifies a secure asset, and source and destination addresses within the secure and public address spaces. The secure module includes an internal memory storing secure assets identifiable by the tokens; a memory access circuit connected to read data from the source addresses and write processed data to the destination addresses; and a cryptography engine configured to process the read data using the identified secure assets. The secure module is configured to also respond to tokens posted by the host processor in non-secure mode. The internal memory of the secure module stores a rule together with each secure asset, defining permissions as to the address spaces where the memory access circuit may read and write the data. The secure module ignores tokens that do not satisfy the permissions defined for the corresponding assets.

The data processing system may include cross-domain rules for tokens posted by the host processor in non-secure mode, that allow reading data from one of the public and secure address spaces and writing resulting data to the other of the public and secure address spaces.

A cross-domain rule may allow reading data from the public address space and writing resulting data to the secure address space in response to a decryption token.

A cross-domain rule may allow reading data from the secure address space and writing resulting data to the public address space in response to an encryption token.

All rules for assets installed in the internal memory by the host processor in non-secure mode may constrain access to the public address space.

The rules may include a flag identifying the secure or public address space where source data is located, and each rule may constrain read access to the address space identified by the corresponding flag.

The resources accessible through the secure address space may include a system memory area and a secure peripheral.

BRIEF DESCRIPTION OF DRAWINGS

Other advantages and features will become more clearly apparent from the following description of particular embodiments, which are provided for exemplary purposes only and represented in the appended drawings, in which.

DETAILED DESCRIPTION

Figure 1:
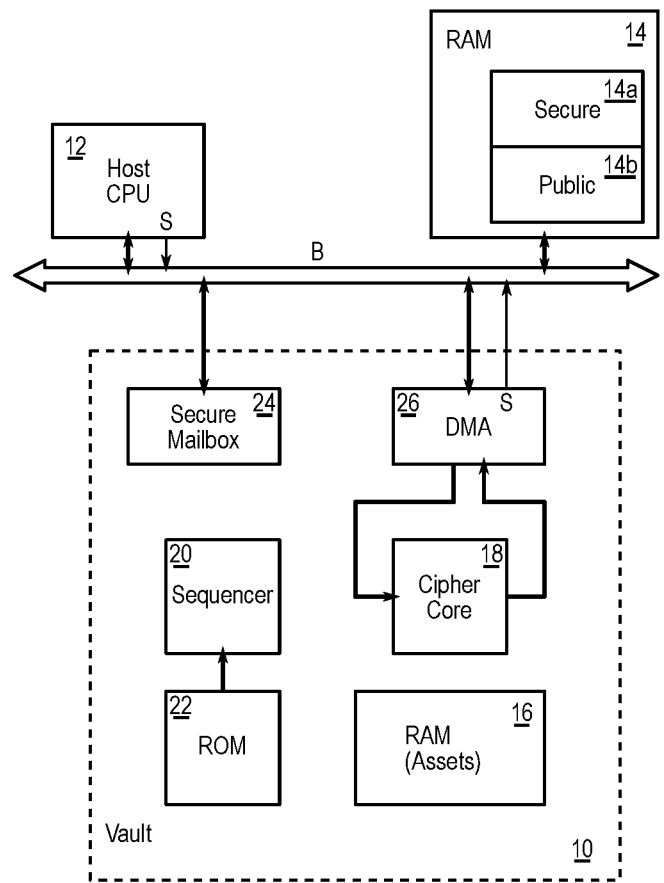
FIG. 1 is a block diagram of an exemplary data processing system including a Trusted Execution Environment implemented around a secure module having an asset store.
Figure 2:
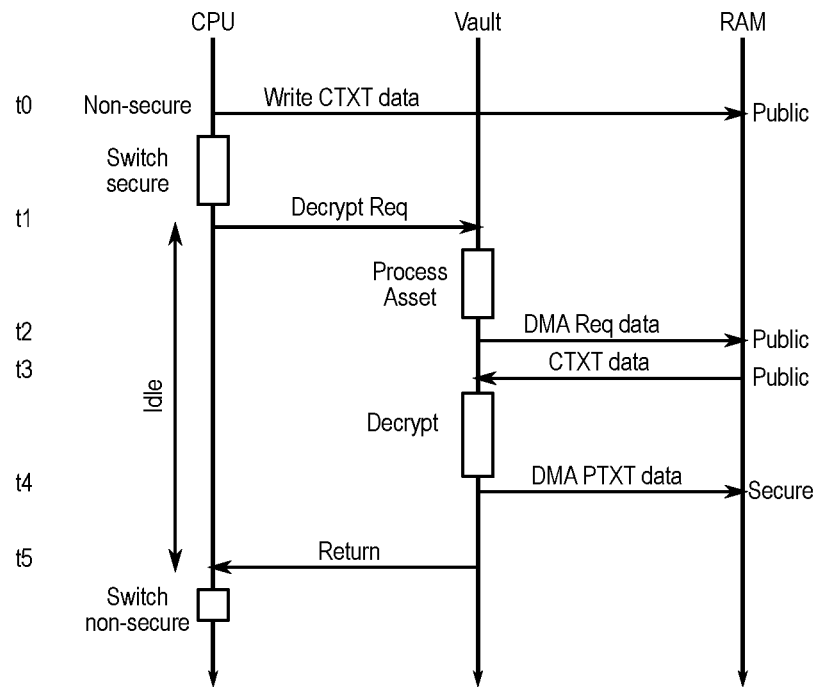
FIG. 2 is a time diagram of a decryption process as it may be carried out by the system of FIG. 1.

FIG. 2 is a time diagram that illustrates a possible use of the trusted execution environment in the data processing system of FIG. 1. A decryption process is taken as an exemplary use case. Operations carried out in the host CPU 12, in the vault 10 and in the system memory (RAM) 14 are illustrated on respective vertical axes. Horizontal arrows show communications between these elements.

At a time t0, the CPU writes a ciphertext data block CTXT in the public area 14b of the memory. The ciphertext data is, for example, a DRM-protected media segment. The key for decrypting the data is an asset stored in the internal memory 16 (Asset store) of the vault. This asset has been installed beforehand by the CPU in secure mode.

When the data CTXT has been written, the CPU switches to secure mode. As mentioned above, such an action has a significant overhead and takes several clock cycles.

At a time t1, the CPU, now in secure mode, writes a token in the vault's mailbox. The token is a decrypt request specifying the source address of the ciphertext data block (in public memory), the destination address in secure memory, the asset to use, and eventually the cipher to use and the size of the data block.

The CPU remains in secure mode and idles until the result of the operation is returned at a time t5, when the vault has completed the request. When the CPU executes an operation in secure mode, it may not switch to non-secure mode until the operation is completed.

In response to the token, the vault processes the asset, i.e. fetches the asset in the internal memory, checks if it may be used, and programs the corresponding cipher engine.

At a time t2, the vault issues a request through its DMA controller 26 to fetch a data sequence at the specified source address, in public memory.

At a time t3, the requested data, i.e. the ciphertext data CTXT, is received from the memory by the DMA controller and decrypted by the cipher core.

At a time t4, the processed data, plaintext data PTXT, is written in secure memory by the DMA controller.

At a time t5, the vault returns a status indicating that the request was successfully processed. The CPU wakes up and may switch back to non-secure mode.

In practice, the data block to process identified in the token may be larger than the data sequence that can be accepted by the cipher core 18 and internal buffering in the vault. In such a case, steps t2 to t4 may be repeated in a loop to process the data block piecewise in multiple cycles.

The time diagram of FIG. 2 thus shows that the CPU switches to secure mode for posting each token, and stays idle until the operation requested in the token finishes. This represents a significant overhead during which the CPU cannot attend to other tasks. The overhead of switching to secure mode may in practice be longer than the actual time taken by the vault to process the token (t5-t1).

The vault in the system of FIG. 1 is typically designed to ignore or reject tokens posted to it by untrusted code, i.e. posted by the CPU in non-secure mode. Indeed, untrusted code could post tokens that direct decrypted, plaintext data to the public memory, where it would be exposed and compromised. Switching the CPU to secure mode is generally required for posting tokens that use secure assets or require access to the secure memory domain.

It is proposed herein to modify the vault structure so that tokens involving assets can be posted to it in non-secure mode while preserving data security requirements. Since tokens can be posted in non-secure mode, the overhead of switching to secure mode is avoided. Moreover, the CPU no longer needs to idle while the vault processes the posted token.

Figure 3:
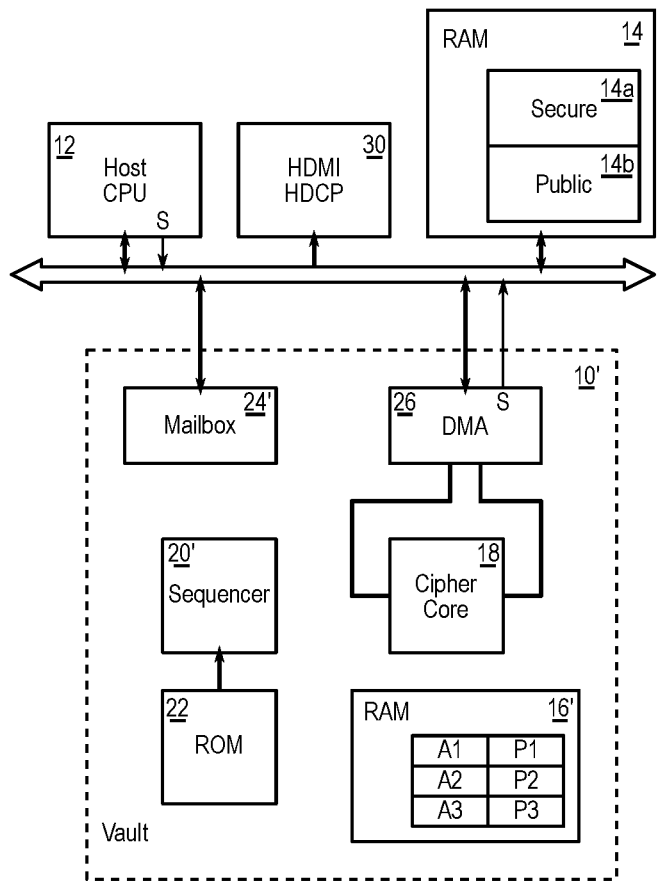
FIG. 3 is a block diagram of a data processing system including a Trusted Execution Environment implemented around an embodiment of a secure module storing assets with rules.

FIG. 3 is a block diagram of a data processing system similar to that of FIG. 1, with a modified secure module 10'. Similar elements to those of FIG. 1 bear same reference labels. A difference is that the internal memory 16' stores each asset Ax with a rule Px defining permissions for using the asset. The sequencer 20' is designed to interpret the rules assigned to the assets based on the asset installer domain (asset installed in secure or non-secure mode), the token poster domain (token posted in secure or non-secure mode), the source data domain (public or secure memory), and the operation direction (same domain or cross-domain). Moreover, the mailbox 24' is no longer "secure" in that the CPU may post tokens to it both in secure and non-secure modes.

The source data domain and the operation direction may be encoded in individual bits forming a 2-bit rule Px stored with the corresponding asset Ax. Since the installer domain is specific to each asset, it may be encoded in a third bit of the rule Px. The token domain may vary between different uses of a same asset, so it may be evaluated by the sequencer upon processing each token. The permissions may be expressed as read and write accesses to each of the secure and public areas of the RAM memory 14. Table 1 below is an example summarizing the RAM read and write permissions based on the four parameters mentioned above. The column X-Domain is a flag indicating whether the operation should cross domains (Yes) or not (No). The Read RAM and Write RAM columns are flags that set the actual permissions resulting from the information in the previous columns—these permission flags indicate the memory domains (Secure, Public) to which read or write access is allowed. Some combinations do not allow access at all to the memory.

TABLE 1

| Asset Installer Domain | Token Domain | Source Data Domain | X-Domain | Read RAM | Write RAM |
|---|---|---|---|---|---|
| Secure | Secure | Secure | No | Secure | Secure |
| Secure | Secure | Secure | Yes | Secure | Public |
| Secure | Secure | Public | No | Not allowed | |
| Secure | Secure | Public | Yes | Public | Secure |
| Secure | Non-secure | Secure | No | Not allowed | |
| Secure | Non-secure | Secure | Yes | Secure | Public |
| Secure | Non-secure | Public | No | Public | Public |
| Secure | Non-secure | Public | Yes | Public | Secure |
| Non-secure | Secure | Secure | | Not allowed | |
| Non-secure | Secure | Public | Yes | Not allowed | |
| Non-secure | Secure | Public | No | Public | Public |
| Non-secure | Non-secure | Secure | | Not allowed | |
| Non-secure | Non-secure | Public | No | Public | Public |
| Non-secure | Non-secure | Public | Yes | Not allowed | |

The permissions are crafted in particular so that, in lower security contexts, such as when the token domain is non-secure, ciphertext data stored in the public memory can only be decrypted to secure memory, and plaintext data stored in the secure memory is always encrypted when it is transferred outside the secure domain.

A few generic rules result from this table. Read access to the memory, when allowed, is constrained to the same domain as the source data. Read and write accesses, when allowed, are constrained to the public memory if the asset originates from the non-secure domain, whereby cross-domain operations are not allowed.

Note in particular that rules allow cross-domain operations in both directions for non-secure tokens, i.e. tokens posted by the CPU in non-secure mode.

The permissions may be checked by the sequencer 20' as a token is processed. The sequencer reads the asset identified by the token, together with its rule, for instance three bits corresponding to the asset installer domain, the source data domain and the cross-domain flag. The token domain information is known when the token is posted. From these four pieces of information, the sequencer establishes the permissions according to the two last columns of the table. If the token conveys source and destination addresses that do not match the permissions, the token is ignored or rejected.

Figure 4:
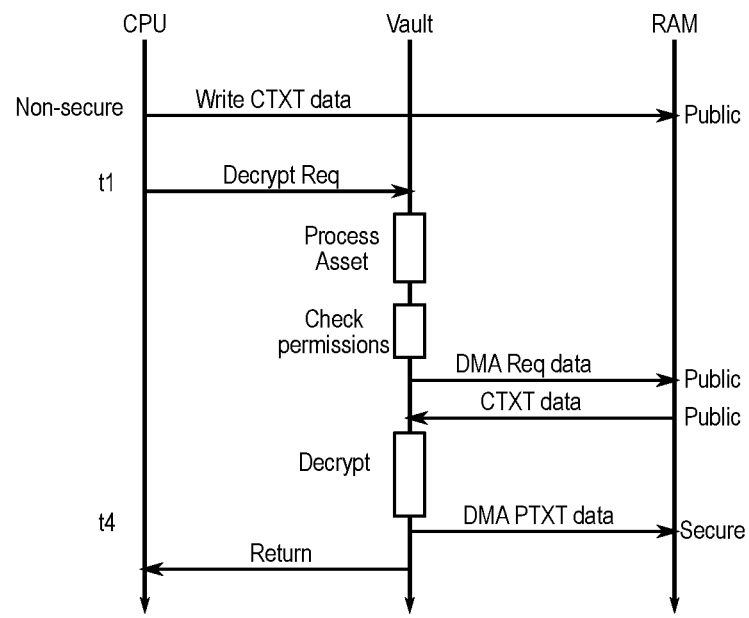
FIG. 4 is a time diagram of a decryption process as it may be carried out by the system of FIG. 3.

FIG. 4 is a time diagram of a decryption process as it may be carried out by the system of FIG. 3. It is similar to the diagram of FIG. 2, except that the CPU may post the decrypt token at time t1 while remaining in non-secure mode. The CPU may then idle awaiting the return status of the operation or switch to another task.

The asset processing phase includes permission checking as mentioned above, based on the rule stored with the asset. If the permission check succeeds, and the asset is intended for the operation, the requested operation is performed. Otherwise the operation is discarded and a failure status may be returned to the CPU.

As shown in FIG. 3, the system may include a trusted peripheral connected to the bus, such as an HDMI interface 30 implementing HDCP protection. Typically, if the system receives DRM protected content, the system may be configured to decrypt this content into the secure memory 14*a* through the vault. From there, the CPU, in secure mode, may transfer the decrypted data to the HDMI interface for display. The CPU, still in secure mode, would have previously configured the HDCP protocol with a key asset stored in the vault.

The system may typically be configured to map heterogeneous resources, such as the memory and the HDMI interface, to a contiguous virtual memory space. A secure virtual memory space may be allocated to both the secure memory area 14*a* and the HDMI interface. In this context, reading and writing in public or secure memory areas may be referred to more generally as reading and writing in public or secure address spaces. Then, instead of first writing the decrypted data into the secure memory area 14*a* at time t4, the DMA controller may be provided with a virtual destination address that corresponds to the HDMI interface, whereby the decrypted data may be directly transferred to a media renderer.

In addition, a VaultIP-130 circuit is designed with a secure interface for directly transferring HDCP keys from the asset store to an external HDMI interface.

With such a structure, the CPU may remain in non-secure mode throughout the decryption and rendering of DRM-protected content. The only times the CPU would need to switch into secure mode is when installing an initial key asset for the DRM decryption in the vault, and eventually when renewing the keys as they expire.

A DRM decryption process has been described as a particular application example using assets stored with rules. Similar benefits may be obtained in other applications, such as DRM encryption or any other application using cryptography and a trusted execution environment.

What is claimed is:

1. A data processing system with a trusted execution environment, the data processing system comprising:
a secure module configured to couple to a host processor and a resource via a system bus, the secure module configured to respond to commands posted by the host processor in a secure mode and a non-secure mode, the secure module comprising:
an internal memory to store a plurality of cryptographic keys identified by the commands and to store a respective rule corresponding to each of the plurality of cryptographic keys, the respective rule defining permissions as to a public address space associated with a non-secure area of the resource and a secure address space associated with a secure area of the resource;
a memory access circuit configured to, for a respective command, read data from the resource using a source address identified by the respective command and write processed data to the resource using a destination address identified by the respective command; and
a cryptography engine configured to, for a given command, process the read data using a respective cryptographic key identified by the respective command.

2. The data processing system of claim 1, further comprising cross-domain rules associated with respective ones of the commands posted by the host processor in the non-secure mode, the cross-domain rules allowing for reading data from one of the public address space or the secure address space and writing resulting data to another one of the public address space or the secure address space.

3. The data processing system of claim 2, wherein a cross-domain rule of the cross-domain rules allows for reading the data from the public address space and writing the resulting data to the secure address space in response to receiving a decryption command.

4. The data processing system of claim 2, wherein a cross-domain rule of the cross-domain rules allows for reading the data from the secure address space and writing the resulting data to the public address space in response to receiving an encryption command.

5. The data processing system of claim 1, wherein the respective rule corresponding to each of the plurality of cryptographic keys constrains access to the public address space when the host processor is in the non-secure mode.

6. The data processing system of claim 1, wherein the respective rule includes a flag identifying one of the secure address space or the public address space where source data is located, and wherein the respective rule constrains read access to the one of the secure address space or the public address space identified by the flag.

7. The data processing system of claim 1, wherein the resource is part of a plurality of resources comprising a system memory and a secure peripheral.

8. A method of data processing in a trusted execution environment, comprising:
receiving, by a secure module coupled to a host processor and a resource via a system bus, a command from the host processor operating in a secure mode or a non-secure mode;
identifying a cryptographic key stored at the secure module and identified by the command, and a rule associated with the cryptographic key and stored at the secure module, the rule defining permissions for using the cryptographic key at least with respect to a public address space associated with a non-secure area of the resource and a secure address space associated with a secure area of the resource;

determining whether the rule is satisfied based on the command; and responsive to determining that the rule is satisfied based on the command, performing one or more cryptographic processes in accordance with the command.

9. The method of claim 8, wherein determining whether the rule is satisfied based on the command comprises:

determining a source address and a destination address identified by the command, each of the source address and the destination address corresponding to one of the public address space associated with the non-secure area of the resource and the secure address space associated with the secure area of the resource; and determining whether the source address and the destination address identified by the command satisfy a source address and a destination address identified by the rule, wherein the rule is satisfied responsive to determining that the source address and the destination address identified by the command satisfy the source address and the destination address identified by the rule.

10. The method of claim 8, wherein performing the one or more cryptographic processes in accordance with the command comprises:

reading data from the resource using a source address identified by the command; and writing processed data to the resource using a destination address identified by the command.

11. The method of claim 10, wherein performing the one or more cryptographic processes in accordance with the command further comprises:

processing the read data using the cryptographic key identified by the command.

12. The method of claim 8, wherein the rule comprises a cross-domain rule that allows for reading data from one of the public address space or the secure address space and writing resulting data to another one of the public address space or the secure address space.

13. The method of claim 12, wherein the cross-domain rule permits reading the data from the public address space and writing the resulting data to the secure address space in response to receiving a decryption command.

14. The method of claim 12, wherein the cross-domain rule permits reading the data from the secure address space and writing the resulting data to the public address space in response to receiving an encryption command.

15. A non-transitory computer-readable medium comprising instructions for data processing in a trusted execution environment and that, responsive to execution by a processing device, cause the processing device to perform operations comprising:

receiving, by a secure module of the processing device that is coupled to a host processor and a resource via a system bus, a command from the host processor operating in a secure mode or a non-secure mode;

identifying a cryptographic key stored at the secure module and identified by the command, and a rule associated with the cryptographic key and stored at the secure module, the rule defining permissions for using the cryptographic key at least with respect to a public address space associated with a non-secure area of the resource and a secure address space associated with a secure area of the resource;

determining whether the rule is satisfied based on the command; and responsive to determining that the rule is satisfied based on the command, performing one or more cryptographic processes in accordance with the command.

16. The non-transitory computer-readable medium of claim 15, wherein determining whether the rule is satisfied based on the command, the operations comprises:

determining a source address and a destination address identified by the command, each of the source address and the destination address corresponding to one of the public address space associated with the non-secure area of the resource and the secure address space associated with the secure area of the resource; and determining whether the source address and the destination address identified by the command satisfy a source address and a destination address identified by the rule, wherein the rule is satisfied responsive to determining that the source address and the destination address identified by the command satisfy the source address and the destination address identified by the rule.

17. The non-transitory computer-readable medium of claim 15, wherein performing the one or more cryptographic processes in accordance with the command, the operations comprising:

reading data from the resource using a source address identified by the command; and writing processed data to the resource using a destination address identified by the command.

18. The non-transitory computer-readable medium of claim 17, wherein performing the one or more cryptographic processes in accordance with the command, the operations further comprising:

processing the read data using the cryptographic key identified by the command.

19. The non-transitory computer-readable medium of claim 15, wherein the rule comprises a cross-domain rule that allows for reading data from one of the public address space or the secure address space and writing resulting data to another one of the public address space or the secure address space.

20. The non-transitory computer-readable medium of claim 19, wherein the cross-domain rule permits at least one of reading the data from the public address space and writing the resulting data to the secure address space in response to receiving a decryption command, or reading the data from the secure address space and writing the resulting data to the public address space in response to receiving an encryption command.

* * * * *